(12) United States Patent
Alt

(10) Patent No.: US 7,678,227 B2
(45) Date of Patent: Mar. 16, 2010

(54) MULTI-STAGE FLASH EVAPORATOR

(76) Inventor: Friedrich Alt, 10 Pinewood, Irvine, CA (US) 92604

( * ) Notice: Subject to any disclaimer, the term of this patent is extended or adjusted under 35 U.S.C. 154(b) by 1119 days.

(21) Appl. No.: 11/313,454

(22) Filed: Dec. 21, 2005

(65) Prior Publication Data

US 2007/0084712 A1  Apr. 19, 2007

Related U.S. Application Data

(60) Provisional application No. 60/726,845, filed on Oct. 14, 2005.

(51) Int. Cl.
*B01D 1/30* (2006.01)
*B01D 3/06* (2006.01)

(52) U.S. Cl. .................. 159/2.3; 159/DIG. 8; 202/155; 202/172; 202/173; 203/71; 203/88

(58) Field of Classification Search .................. 159/2.3, 159/DIG. 8; 202/155, 172, 173; 203/71, 203/88
See application file for complete search history.

(56) References Cited

U.S. PATENT DOCUMENTS

| | | | |
|---|---|---|---|
| 3,461,039 A | | 8/1969 | Starmer |
| 4,312,710 A | | 1/1982 | Tanaka et al. |
| 4,318,780 A | | 3/1982 | Bailie |
| 4,334,904 A | * | 6/1982 | Apothaker et al. .............. 65/36 |
| 4,334,961 A | | 6/1982 | Moen et al. |
| 4,450,904 A | * | 5/1984 | Volz ............................ 165/162 |
| 4,591,413 A | * | 5/1986 | Peterson ...................... 202/173 |
| 4,871,014 A | * | 10/1989 | Sulzberger .................... 165/76 |
| 5,268,073 A | * | 12/1993 | Casper et al. ............... 159/47.1 |

FOREIGN PATENT DOCUMENTS

| | | |
|---|---|---|
| GB | 1530489 | 11/1978 |
| WO | WO82/04404 | 12/1982 |
| WO | WO2006/106582 | 10/2006 |

OTHER PUBLICATIONS

International Search Report from International Search Authority dated Feb. 14, 2007 for related PCT application No. PCT/US2006/035513.
Written Opinion of the International Searching Authority dated Feb. 14, 2007 for related PCT application No. PCT/US2006/035513.
International Preliminary Report on Patentability from the International Bureau of WIPO dated Apr. 16, 2008 for related PCT application No. PCT/US2006/035513.

* cited by examiner

*Primary Examiner*—Virginia Manoharan
(74) *Attorney, Agent, or Firm*—Klein, O'Neill & Singh, LLP

(57) ABSTRACT

The present invention provides tube bundle configurations for multi stage flash cross tube type evaporators using concepts with parallel and counter current coolant flow. Those tube bundle configurations allow to build the evaporators more compact and provide the possibilities to lower the thermal and electrical energy consumption for a multi stage flash desalination plant by maintaining or reducing the distilled water generation cost as achievable with cross tube evaporators utilizing single pass tube bundles in serial flow communication.

2 Claims, 10 Drawing Sheets

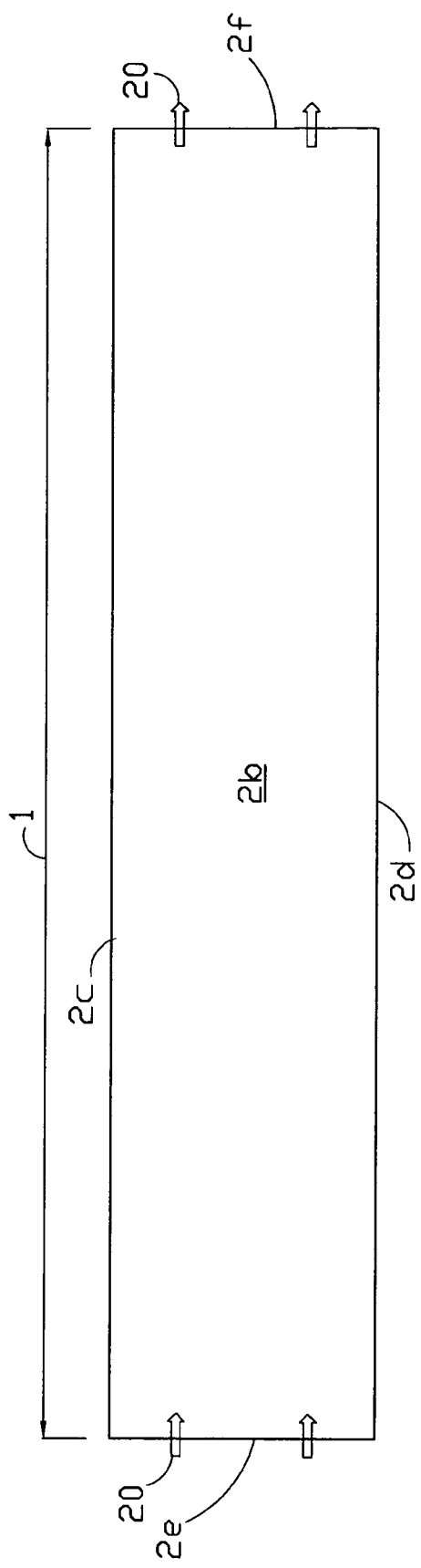
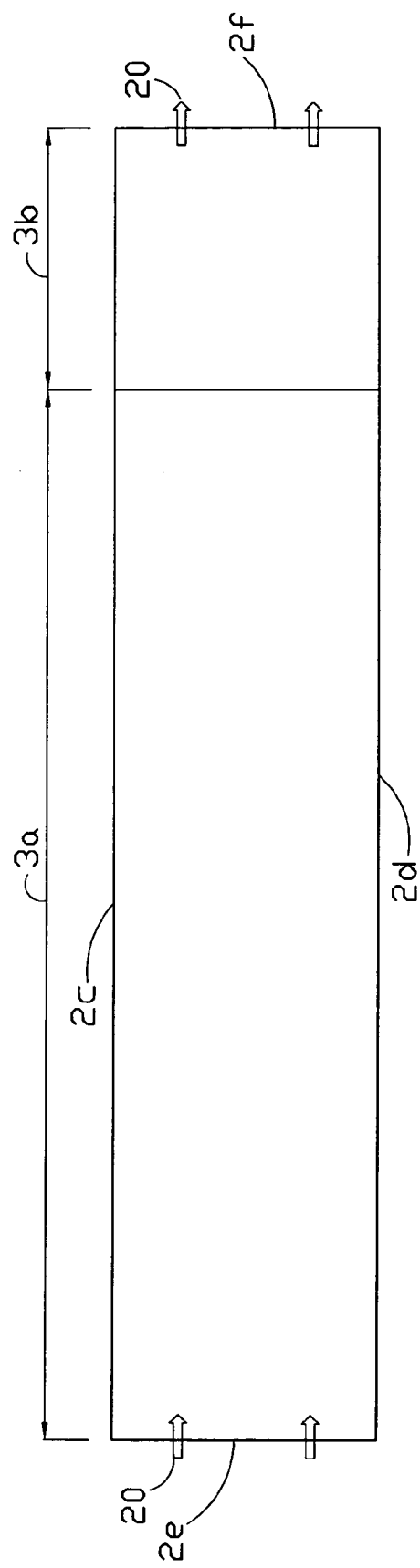
FIGURE 1
FIGURE 2

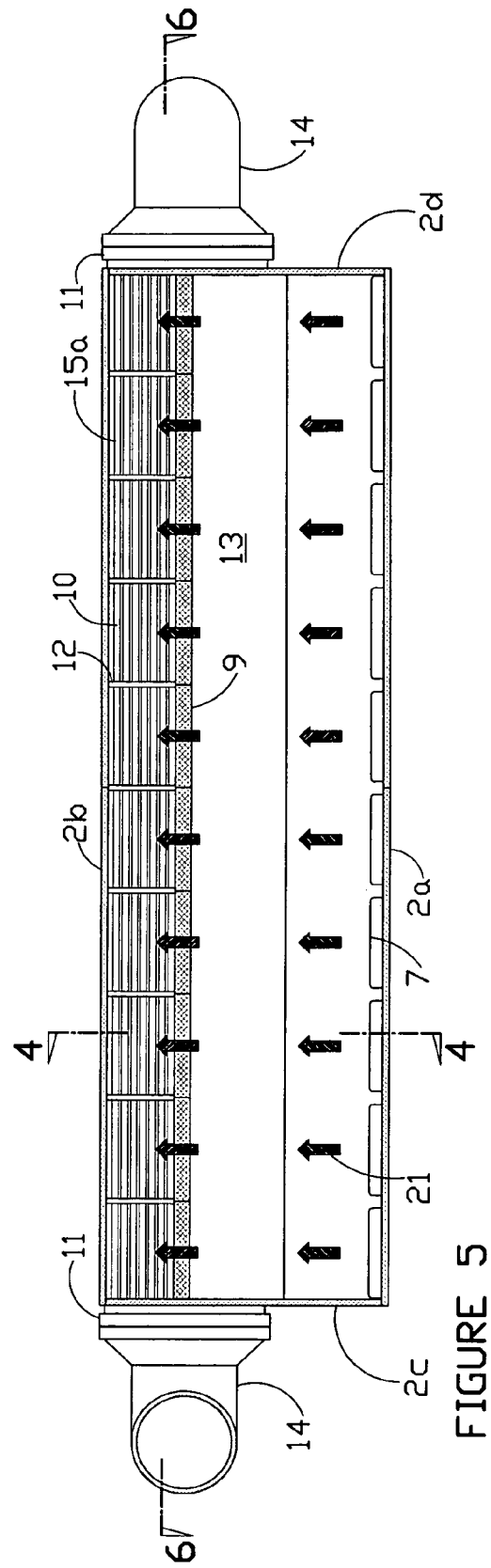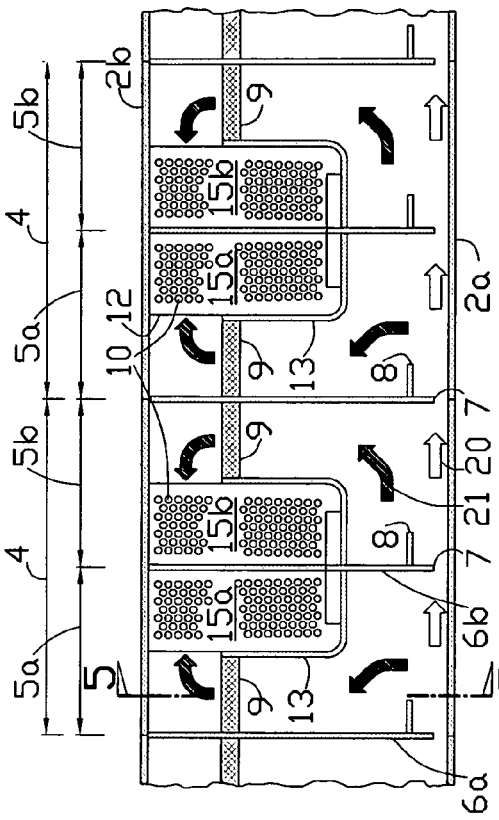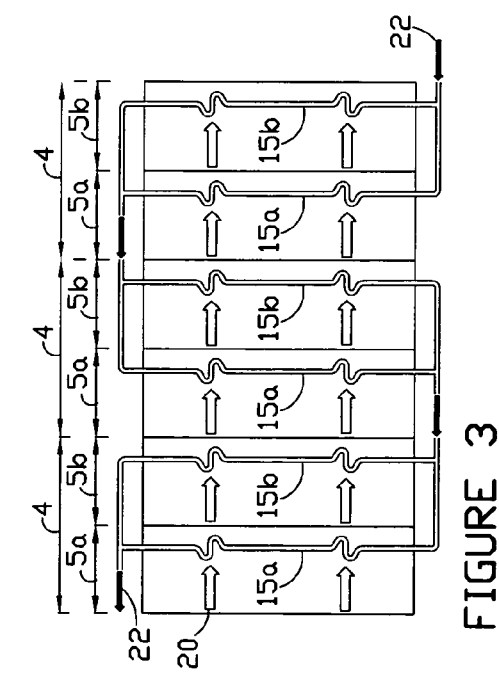

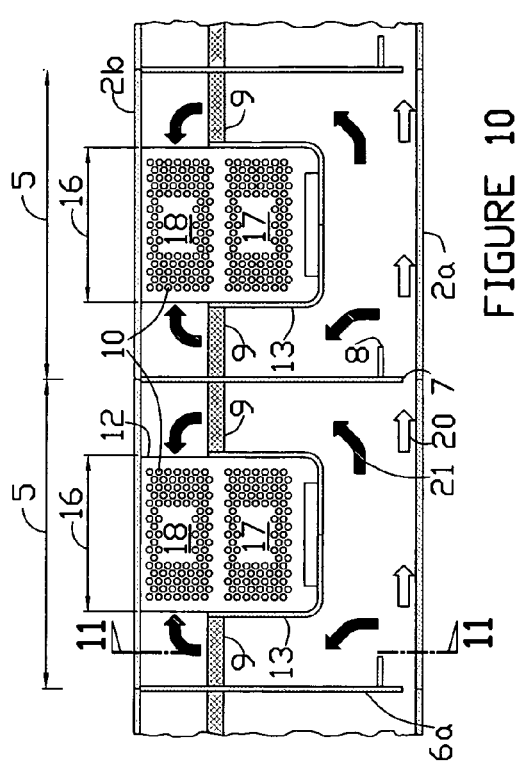
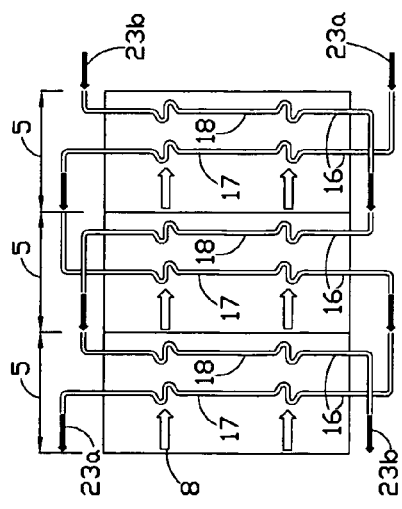
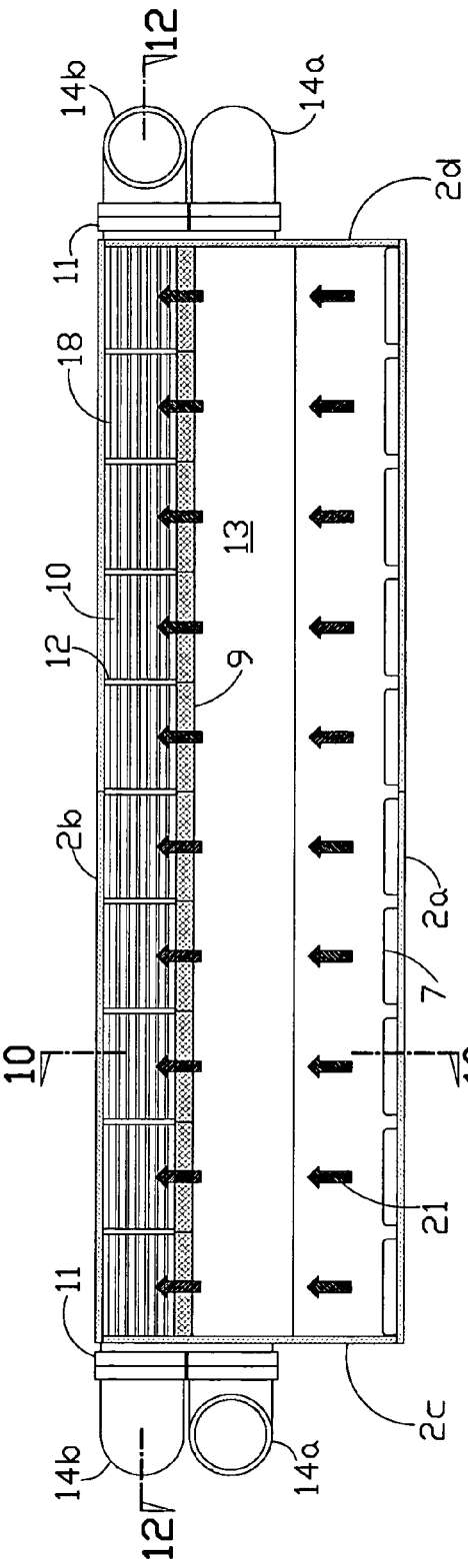
FIGURE 10
FIGURE 9
FIGURE 11

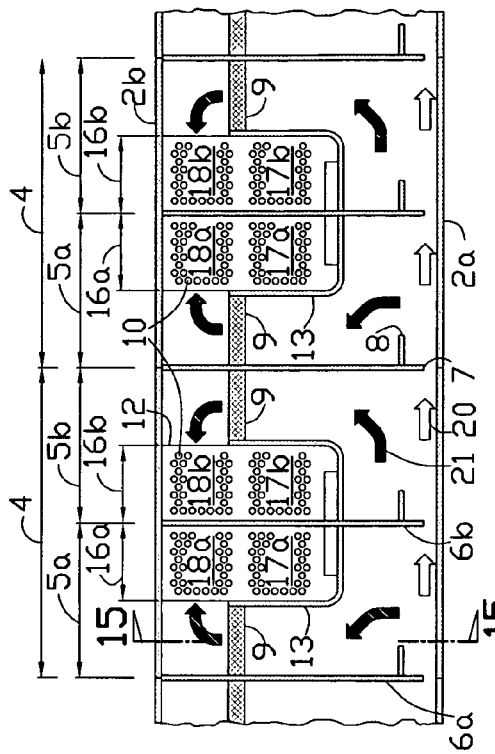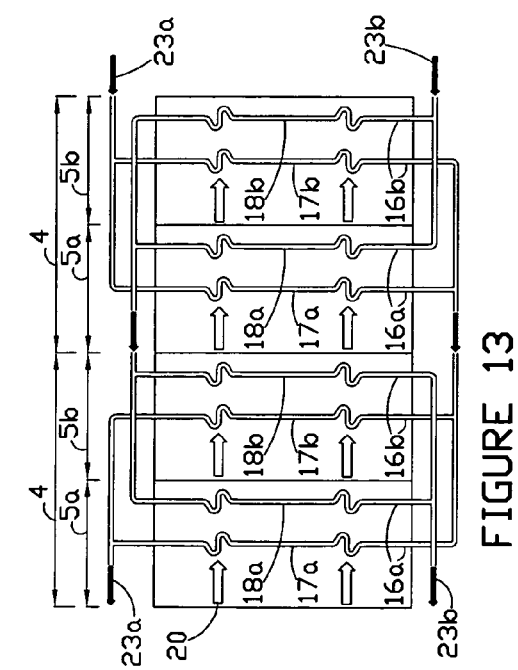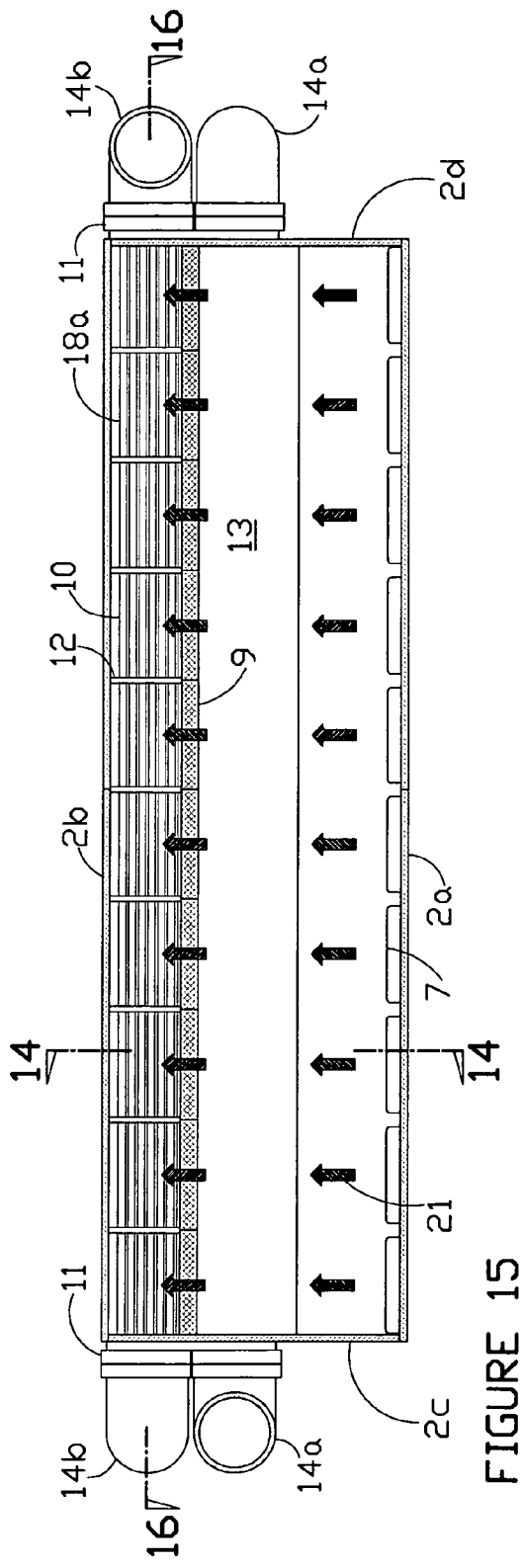

MULTI-STAGE FLASH EVAPORATOR

CROSS-REFERENCE TO RELATED APPLICATIONS

This application claims the benefit, under 35 U.S.C. §119(e), of U.S. Provisional Patent Application No. 60/726,845 filed on Oct. 14, 2005, the disclosure of which is incorporated herein in its entirety.

STATEMENT REGARDING FEDERALLY SPONSORED RESEARCH OR DEVELOPMENT

Not Applicable.

REFERENCE TO A SEQUENCE LISTING

Not Applicable.

BACKGROUND OF THE INVENTION

A multi-stage flash evaporator is the main component of a seawater desalination plant for producing distilled water from sea water. Most evaporators for large capacity desalination plants are of the cross tube type with unit capacities in the range of 10-20 mgd (million gallons per day).

Multi-stage flash evaporators are comprised of a number of flash stages, typically between 15 and 30, where each flash stage is mainly comprised of a flash chamber and a condenser tube bundle. While heated saltwater enters the first flash stage at its highest temperature, the saltwater flashes down and releases some vapor which is then condensed on the condenser tube bundle and collected as distillate. As this process is repeated in each flash stage, the temperature of the saltwater is successively reduced toward the last flash stage while the salt concentration is increasing. The coolant used in the condenser tube bundles enters with the lowest temperature into the condenser tube bundle of the last flash stage and travels through the condenser tube bundles to the first stage, whereby its temperature increases in each tube bundle relative to its temperature in the previous tube bundle. The coolant discharged from the condenser tube bundle of the first flash stage (hot end of the evaporator) is heated in a separate heat exchanger, commonly described as the heat input section, by an external heat source to the top temperature. The coolant discharging from the heat input section then enters the flash chamber of the first flash stage at its top temperature.

The multi-stage flash desalination system may be designed as a "once through" process in which the same coolant is used for all condenser tube bundles in the evaporator flash stages. In other words, the coolant travels through all tube bundles arranged in series, starting from the coldest flash stage to the hottest flash stage.

The most common design concept for multi stage flash desalination plants is the "brine re-circulation" system, in which the evaporator consists of a heat recovery section and a heat rejection section. The heat rejection section comprises a number of flash stages on the cold end of the evaporator, typically 2 to 3 stages, in which fresh seawater is commonly used as a coolant for the tube bundles. In the heat recovery section, which occupies the larger number of flash stages in the evaporator, the heat released from the flashing brine is recovered by the coolant in the tube bundles and used to bring the coolant toward the desired top temperature. A mixture of concentrated brine from the last flash stage and fresh seawater from the coolant discharge of the heat rejection section, commonly described as re-circulating brine, is used as coolant for the heat recovery section. The fresh seawater portion replaces the amount of distillate and concentrated brine discharged from the last flash stage. It is treated in order to limit scaling of the heat exchanger surface and to limit corrosion in the system.

Individual types of evaporators may be differentiated by the tube bundle configuration such as long tube type evaporators and cross tube evaporators. In the long tube type evaporator, the condenser tube bundles are oriented in the flow direction of the flashing brine in the flash stages. This type of evaporator is commonly built in a number of individual modules, where each module contains several flash stages. Each module has one tube bundle with a tube sheet and water box on each end. Individual sections of the tube bundle serve as the condenser tube bundle for the individual flash stages in such module. Tube bundles of the individual modules are typically arranged in serial flow communication.

In the cross tube evaporator, the condenser tube bundles are oriented perpendicular to the flow direction of the flashing brine. In most cross tube type evaporators, each flash stage has an individual tube bundle with tube sheets and water boxes. The tube bundles are typically arranged in a serial flow communication.

In the double stage cross tube type evaporator, a pair of flash stages is equipped with one single pass tube bundle. The partition walls between the two flash stages are arranged such, that the tube bundle is divided at about half the tube length, so that the vapor from the flash stage with the lower vapor temperature condenses on the colder half of the tube bundle, while the vapor from the flash stage with the higher vapor temperature condenses on the warmer part of the tube bundle. With this configuration, the vapor released from the brine uniformly over the width of the flash stage has to travel in one flash stage to one half of the tube bundle and in the following flash stage to the other half of the tube bundle, which creates significant transverse vapor movements in the flash stages.

SUMMARY OF THE PRESENT INVENTION

The present invention provides design concepts for improved cross tube type evaporators by using the concepts of parallel and counter current coolant flow in the condenser tube bundles. Different flash stages or pairs of flash stages in an evaporator can comprise different design configurations. Compared to evaporators designed with flash stages having individual single pass tube bundles connected in series flow communication, the improved cross tube type evaporators allow to lower the cost of a desalination plant by maintaining or lowering a specified thermal energy consumption and/or lowering the electrical power consumption.

The design configuration of a first embodiment of the present invention provides for pairs of flash stages with single pass tube bundles, where the coolant for the tube bundles of both flash stages is fed in parallel.

The design configuration of the second embodiment of the present invention provides for single flash stages with double pass tube bundles, where two individual coolant streams flow in counter current direction through the individual tube bundle passes, which significantly improves the uniformity of the vapor distribution over the tube bundle and mist eliminators, which results in lower irreversible temperature losses in the flash stages and consequently, also in an improvement of the evaporator performance.

The design configuration of the third embodiment of the present invention provides for pairs of flash stages with individual double pass tube bundles, where a first coolant stream is fed to one of the tube bundle passes of each tube bundle in parallel, while a second coolant stream is fed also in parallel to the second tube bundle passes of each tube bundle and both coolant streams flow in counter current direction through the tube bundle passes of each tube bundle.

The design configuration of the fourth embodiment of the present invention provides for pairs of flash stages with one common double pass tube bundle with a first tube bundle pass and a second tube bundle pass. The coolant is split into two coolant streams where the first coolant stream is fed to the first tube bundle pass of the common double pass tube bundle, while the second coolant stream is fed into the second tube bundle pass of the same double pass tube bundle. The two coolant streams flow in counter-current directions through the tube bundle passes. Furthermore, the vapor space of the two flash stages is separated such that each tube bundle pass is divided into two tube bundle pass sections and the first tube bundle pass sections of each tube bundle pass, to which the coolant streams are entering, are exposed to the flash stage with the lower vapor temperature, while the second tube bundle pass sections are exposed to the vapor of the flash stage with the higher vapor temperature.

An evaporator may be designed using one of the configurations for all flash stages or different design configurations of flash stages may be applied in an evaporator design at the same time, wherein flash stages with single pass tube bundles communicating in serial flow may also be included.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1 shows a simplified plan view of a multi stage flash cross tube evaporator;

FIG. 2 shows a simplified of a multi stage flash cross tube evaporator having a first evaporator part and a second evaporator part;

FIG. 3 shows a simplified flow schematic of a part of an evaporator with the first design configuration according to the first embodiment of the present invention;

FIG. 4 shows a longitudinal section of a part of an evaporator with the design configuration according to the first embodiment of the present invention, taken along lines 4-4 as indicated in FIG. 5;

FIG. 5 shows a cross section of an evaporator, with a design configuration according to the first embodiment of the present invention, taken along lines 5-5 as indicated in FIG. 4;

FIG. 9 shows a simplified flow schematic of a part of an evaporator, with a design configuration according to the second embodiment of the present invention;

FIG. 10 shows a longitudinal section of a part of an evaporator with the design configuration according to the second embodiment of the present invention, taken along the lines 10-10 as indicated in FIG. 11;

FIG. 11 shows a cross section of an evaporator, with a design configuration according to the second embodiment of the present invention, taken along lines 11-11 as indicated in FIG. 10;

FIG. 13 shows a simplified flow schematic of a part of an evaporator, with a design configuration according to the third embodiment of the present invention;

FIG. 14 shows a longitudinal section of a part of an evaporator with a design configuration according to the third embodiment of the present invention, taken along the lines 14-14 as indicated in FIG. 15;

FIG. 15 shows a cross section of an evaporator, with a design configuration according to the third embodiment of the present invention, taken along lines 15-15 as indicated in FIG. 14;

DETAILED DESCRIPTION OF THE PREFERRED EMBODIMENTS

Figure 6:
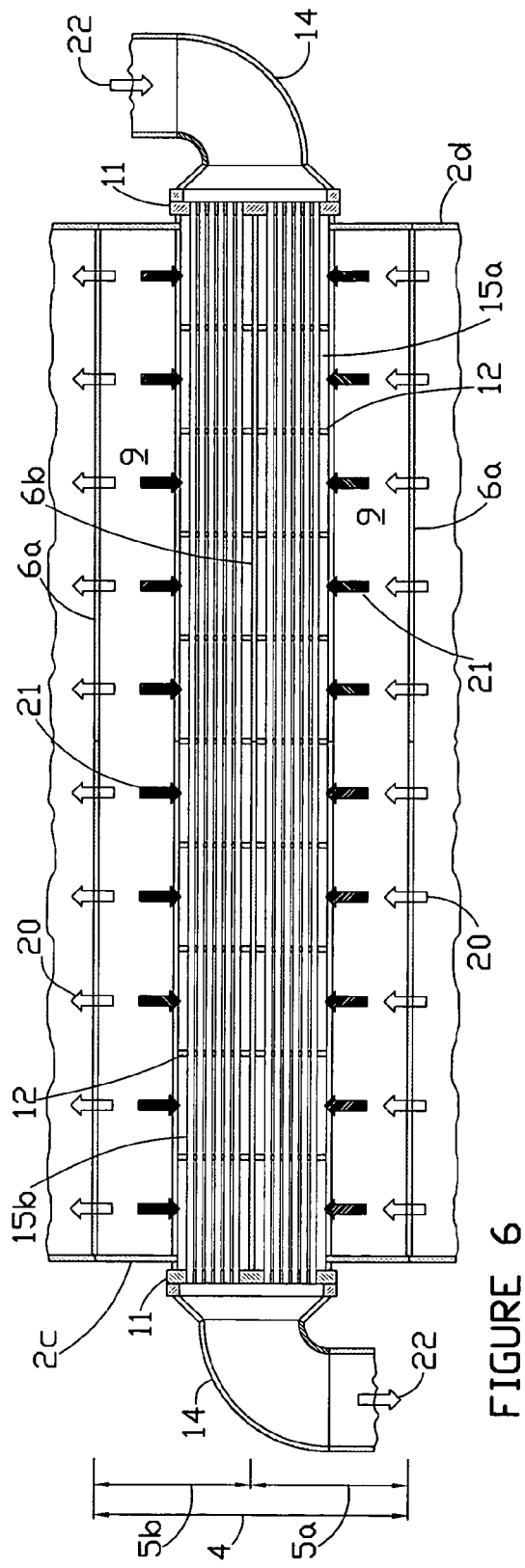
FIG. 6 shows a horizontal section, of a part of an evaporator with a design configuration according to the first embodiment of the present invention, taken along lines 6-6 as indicated in FIG. 5.

Typical multi stage flash cross tube evaporators 1 are shown in a simplified form in FIGS. 1 and 2, while design configurations and examples of evaporator details in accordance with the present invention are shown in FIGS. 3 to 22.

The expression 'longitudinal' used in the description of the drawings is the direction of the flashing brine flow 20 in the evaporator, while the expressions 'cross', 'left' 'and 'right' relate to the orientation perpendicular to the flashing brine flow when looking at a plan view or horizontal section or into the flashing brine flow direction.

The wall thickness of evaporator shell parts and tube bundle shell parts shown in the drawings are not shown in true proportion to the evaporator size, but are shown with significantly larger wall thickness for clarity purpose of the cross sections, in order to allow a clear differentiation between cut and non-cut parts.

As shown in the simplified plan view FIG. 1, an evaporator is commonly built as a rectangular elongated vessel having an evaporator shell bottom (not shown), an evaporator roof 2b, a left side wall 2c, a right side wall 2d, a first end wall 2e, and a second end wall 2f. The evaporator 1 is comprised of a plurality of flash stages through which the flashing brine 20 is passed in serial flow communication from the flash stage with the highest operation temperature (located next to the first end wall 2e) to the flash stage with the lowest operation temperature (located next to the second end wall 2f). An evaporator designed for a "once through" system uses only one type of coolant, typically seawater for all flash stages.

The evaporator 1 may also contain a first evaporator section 3a and a second evaporator section 3b, as shown in the simplified plan view FIG. 2. An evaporator containing two sections is used for a brine re-circulation process, where typically different types of coolants are used for the individual evaporator sections. Seawater is typically used as the coolant for the second evaporator section 3b, commonly described as the heat rejection section, while in the first evaporator section 3a, commonly described as the heat recovery section, re-circulating brine is used as the coolant.

The present invention provides design concepts for improved cross tube type evaporators by using tube bundle configurations with parallel and counter current coolant flow. The configurations of the flash stages and tube bundles for the individual design features shown in the individual figures are only typical examples, focusing primarily on design concepts for evaporator capacities in the range of 10-20 mgd (million gallons per day) of distillate generation, equal to about 38,000-76,000 m3/day (cubic meters per day), which are common evaporator capacities on the current market. Those evaporators typically have a flash stage width (side wall 2c to side wall 2d) in the range of 40-80 ft (12-24 m) and a stage height (bottom 2a to roof 2b) in the range of 10-18 ft (3.0-5.4 m). Nevertheless, the design configurations of the present invention are also suitable for larger or smaller evaporator capacities. The number of flash stages in an evaporator may be limited only by the economics of an evaporator design and the related performance data.

The evaporators allow for a wide variety of different designs, for example round tube bundles or rectangular tube bundles with different width/height ratios etc., variation of stage width, tube diameters and the number of tubes in a tube bundle. Details of the partition walls and brine weir gates, which are not the subject to the present invention, may also vary. Design details, such as inter-stage distillate transport and tube bundle venting are not shown as those features are commonly known details for an evaporator design.

An evaporator may be designed with all flash stages or pairs of flash stages using one design configuration of the present invention or different design configurations of the present invention for different flash stages or pairs of flash stages. It is also possible to integrate in such evaporator flash stages of prior art, such as flash stages with single pass tube bundles in serial flow communication.

A first design configuration of the first embodiment of the present invention is shown in FIG. 3, for a limited number of pairs of flash stages 4. Each pair of flash stages 4 comprises a first flash stage 5a having a first single pass tube bundle 15a and a second flash stage 5b having a second single pass tube bundle 15b. Flashing brine 20 enters the first flash stage 5a where it is flashed down to a lower temperature and releases vapor 21 (see FIGS. 4 and 5) before being passed to the second flash stage 5b where the flashing brine 20 is again flashed down to yet a lower temperature while releasing additional vapor 21. The first flash stage 5a operates at a higher vapor temperature than the second flash stage 5b, due to the stage wise flash down of the brine.

A coolant 22 is fed in parallel to the first and second single pass tube bundles 15a and 15b causing the coolant 22 to flow in the same direction in both the first and second single pass tube bundles 15a and 15b. The temperature of the coolant 22 increases as it travels through the first and second single pass tube bundles 15a and 15b as the heat of condensation is transferred from the vapor 21 into the coolant 22. An example of a longitudinal section of a part of an evaporator of the first embodiment of the present invention, taken along the lines 4-4 as indicated in FIG. 5, is shown in FIG. 4.

FIG. 5 shows an example of a cross section of an evaporator, with the first design configuration of a first embodiment of the present invention, taken along lines 5-5 as indicated in FIG. 4. FIG. 6 shows an example of a horizontal section of a part of an evaporator with the first design configuration according to the first embodiment of the present invention, taken along lines 6-6 as indicated in FIG. 5. A first partition wall 6a separates the pairs of flash stages 4, while a second partition wall 6b separates the first and second flash stages 5a and 5b within a pair of flash stages 4. Openings 7 in the first and second partition walls 6a and 6b are sized so that the flashing brine 20 can pass from the first flash stage 5a, with a higher operation temperature and the higher saturation pressure, to the second flash stage 5b, with a lower operation temperature and lower saturation pressure, driven by the differential pressure, while a certain level of the flashing brine above the openings 7 is maintained so that no vapor 21 can pass.

Splash plates 8 located above the discharge side of the openings 7 prevent the flashing brine 20 from splashing towards mist eliminators 9 when the flashing brine 20 enters a flash stage. As the flashing brine 20 is flashing down in each stage, the vapor 21 is released uniformly over the width (cross section) of the flash stage and travels upwards through the mist eliminators 9 into the first and second single pass tube bundles 15a and 15b, where it condenses on the outer tube surface. Vapor space between the brine surface and the first and second single pass tube bundles 15a and 15b is separated by a tube bundle shell 13, so that all the vapor 21 passes through the mist eliminators 9 before entering into the vapor space of the tube bundles 15a and 15b. Through the mist eliminators 9, a significant amount of saltwater droplets are eliminated from the vapor 21, resulting in a high purity of distillate. The lower portion of the tube bundle shell 13 also serves as a distillate tray.

The first and second single pass tube bundles 15a and 15b are comprised of straight tubes 10 which are fixed on both ends in tube sheets 11. Tube support plates 12, located between the tube sheets 11, support the tubes 10. The coolant 22 is transported to the single pass tube bundles of a pair of flash stages or from the single pass tube bundles of one pair of flash stages to the single pass tube bundles of the next pair of flash stages through water boxes 14 (see FIGS. 5 and 6). The temperature difference between the vapor 21 and the coolant 22 entering into the single pass tube bundles 15a and 15b is significantly higher than the temperature difference between the vapor 21 and the coolant 22 discharging from the same tube bundles. As a result, the rate of condensation on the tube bundle inlet side (the side of the tube bundle where coolant enters) is significantly higher compared to rate of condensation on the tube bundle outlet side (the side of the tube bundle where coolant discharges), which generates a partial transverse vapor flow over the width of the flash stages, resulting in locally increased velocities through the mist eliminators 9. This phenomenon increases with the increasing width/height ratio of the flash stages and the increasing temperature differences between the cold end and the warm end of a single pass tube bundle, which, if neglected in the design of the mist eliminators 9, can result in problems such as local overloading, excessive carry over of saltwater droplets, resulting in undesired impurity of the distillate. Since the vapor temperature of the first flash stage 5a is higher than the vapor temperature of the second flash stage 5b and the coolant 22 enters at the same temperature into both the first and second single pass tube bundles 15a and 15b, the rate of condensation will be higher in the first single pass tube bundle 15a.

Alternative design configurations of the first embodiments for parallel feeding of the coolant 22 to the first and second single pass tube bundles 15a and 15b in a pair of flash stages 4 are possible when feeding individual first and second coolant streams 22a and 22b to the individual single pass tube bundles 15a and 15b and connecting the individual single pass tube bundles 15a and 15b of pairs of-flash stages 4 individually. In this case, the coolant streams 22a and 22b are not in fluid communication, compared to the common coolant stream 22, as shown in FIG. 3 for the first design configuration of the first embodiment of the present invention. In a second design configuration of the first embodiment of the present invention shown in FIG. 7, the coolant 22a passes from the first single pass tube bundle 15a of the first flash stage 5a of a pair of flash stages 4 to a second single pass tube bundle 15b of a second flash stage 5b of the next pair of flash stages 4 and then again to a first single pass tube bundle 15a of a first flash stage 5a of the next pair of flash stages 4, etc. The coolant 22b passes from the second single pass tube bundle 15b of a second flash stage 5b of a pair of flash stages 4 to a first single pass tube bundle 15a of a first flash stage 5a of the next pair of flash stages and then to the second single pass tube bundle 15b of a second flash stage 5b of the next pair of flash stages, etc. This pattern is repeated throughout the stages of the evaporator. This configuration is less desirable as the temperature differences between the vapor 21 and the first and second coolant streams 22a and 22b vary widely from flash stage to flash stage.

Figure 8:
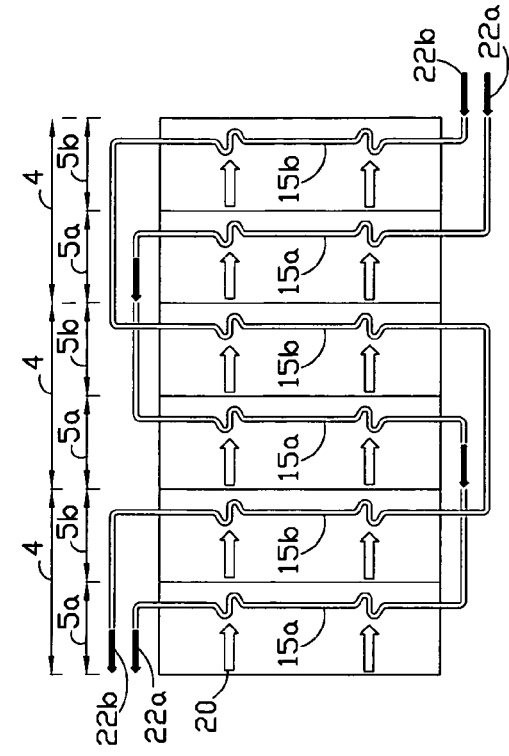
FIG. 8 shows the third design configuration according to the first embodiment of the present invention.
Figure 7:
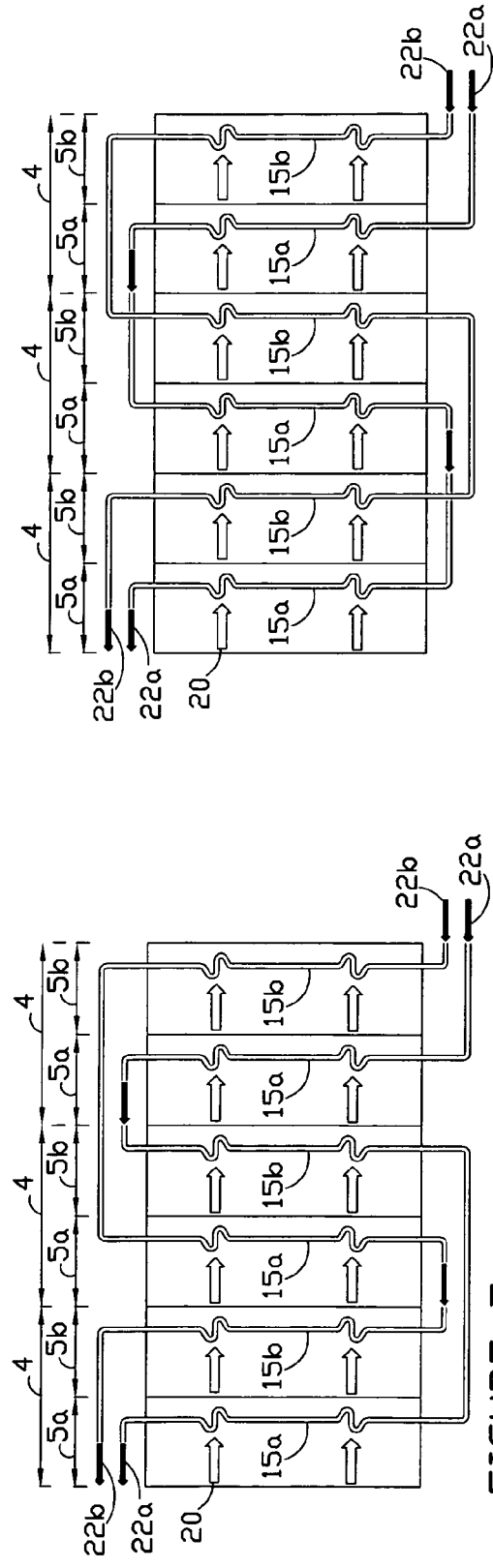
FIG. 7 shows the second design configuration according to the first embodiment of the present invention.

In a third design configuration of the first embodiment of the present invention, shown in FIG. 8, the coolant 22a passes through the first single pass tube bundles 15a of the first flash stages 5a of each pair of flash stages in serial flow communication, while the coolant 22b passes through the second single pass tube bundles 15b of the second flash stages 5b of each pair of flash stages also in serial flow communication. This configuration results in the most uniform temperature difference between the vapor 21 and the first and second coolant streams 22a and 22b. In the second and third design configuration of the first embodiment of the present invention, the single pass tube bundles may be connected by other means, such as, divided water boxes, individual channels or pipes, instead of common water boxes used for the first design configuration of the first embodiment of the present invention.

FIGS. 9-12 show a simplified flow schematic and sectional views of an example of an evaporator, with a design configuration according to a second embodiment of the present invention. Each flash stage 5 comprises a double pass tube bundle 16 having a first tube bundle pass 17 and a second tube bundle pass 18. The coolant is split into a first coolant stream 23a and a second coolant stream 23b where the first coolant stream 23a is fed into the first tube bundle pass 17 of the double pass tube bundle 16, while the second coolant stream 23b is fed into the second tube bundle pass 18 of the same double pass tube bundle so, that both coolant streams 23a and 23b flow in counter current directions through the tube bundle passes 17 and 18. As a result, the end of the first tube bundle pass 17, to which the first coolant 23a enters, is located next to the end of the second tube bundle pass 18 from which the second coolant stream 23b is discharging. Even though the temperature difference between the vapor 21 and the first and second coolant streams 23a and 23b on the coolant inlet side is significantly higher than on the coolant outlet side, the average rate of condensation on each end of the double pass tube bundles 16 and on any tube bundle section in between, is relatively uniform due to the counter current flow of the first and second coolant streams 23a and 23b. As a result, the transverse vapor flow between the uniform vapor release from the flashing brine 20 over the width (cross section) of the flash stages 5 toward the cold ends of the tube bundles, as it takes place in the design configuration of the first embodiment of the present invention with the single pass tube bundles 15a and 15b, is largely eliminated. An example of a longitudinal section of a part of an evaporator with the design configuration of the second embodiment of the present invention, taken along the lines 10-10 as indicated in FIG. 11, is shown in FIG. 10.

Figure 12:
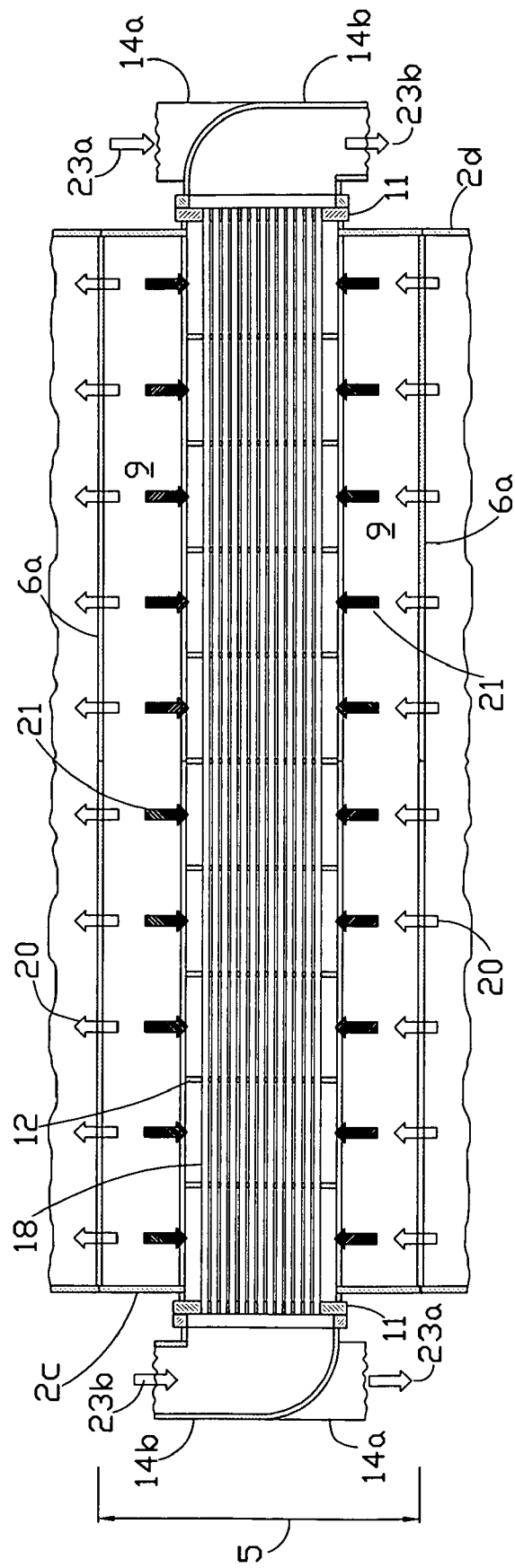
FIG. 12 shows a horizontal section of a part of an evaporator, with the design configuration according to the second embodiment of the present invention, taken along lines 12-12 in FIG. 11.

FIG. 11 shows a cross section of an evaporator, with the design configuration according to the second embodiment of the present invention, taken along lines 11-11 as indicated in FIG. 10. FIG. 12 is a horizontal section of a part of an evaporator, with the design configuration according to the second embodiment of the present invention, taken along lines 12-12 as indicated in FIG. 11. The first tube bundle passes 17 of the flash stages 5 are located in the lower part of the double pass tube bundles 16 while the second tube bundle passes 18 are located in the upper part of the double pass tube bundles 16. In this arrangement, the vapor 21 enters the second tube bundle passes 18 from both sides where a part of the vapor 21 condenses on the tubes 10. The remaining vapor 21 then enters into the first tube bundle passes 17 below, where it condenses. Separate individual water boxes 14a are connected to the first tube bundle passes 17 for the first coolant stream 23a, while water boxes 14b are connected to the second tube bundle passes 18 for the second coolant stream 23b.

If the design configuration of the second embodiment of the present invention were applied to a plurality of flash stages, the first coolant stream 23a would flow in serial flow communication through the first tube bundle passes 17 of the plurality of flash stages. The second coolant stream 23b would also flow through the second tube bundle passes 18 of the same flash stages in serial flow communication, while both coolant streams 23a and 23b flow in all the double pass tube bundles 16 in counter-current directions through the first and second tube bundle passes 17 and 18.

FIGS. 13-16 show a simplified flow schematic and sectional views of an example of an evaporator, with a design configuration according to a third embodiment of the present invention. Each pair of flash stages 4 comprises a first flash stage 5a to which the flashing brine 20 enters, flashes down to a lower temperature and releases vapor 21 before being passed to the second flash stage 5b where it flashes down again to yet a lower temperature while releasing more vapor 21. Consequently, the first flash stage 5a operates at a higher vapor temperature than the second flash stage 5b.

The first flash stage 5a comprises a first double pass tube bundle 16a with a first tube bundle pass 17a and a second tube bundle pass 18a, while the second flash stage 5b comprises a second double pass tube bundle 16b with a first tube bundle pass 17b and a second tube bundle pass 18b. The first coolant stream 23a is fed into the first tube bundle passes 17a and 17b in parallel, while the second coolant stream 23b is fed into the second tube bundle passes 18a and 18b, also in parallel. Furthermore, both the first and second coolant streams 23a and 23b are fed into the tube bundle passes such, that the first coolant stream 23a flows in the first tube bundle passes 17a and 17b in counter-current direction to the second coolant stream 23b in the second tube bundle passes 18a and 18b. FIG. 14 shows an example of a longitudinal section of a part of an evaporator with a design configuration according to the third embodiment of the present invention, taken along the lines 14-14 as indicated in FIG. 15.

Figure 16:
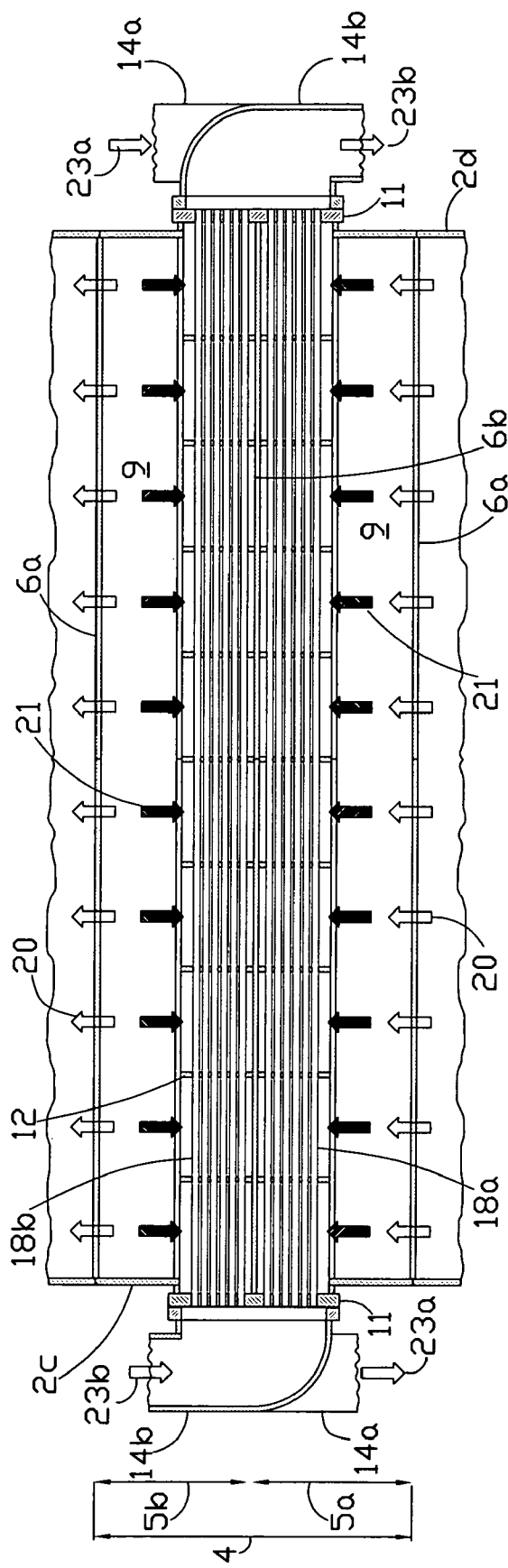
FIG. 16 shows a horizontal section of a part of an evaporator, with the design configuration according to the third embodiment of the present invention, taken along lines 16-16 as indicated in FIG. 15.

FIG. 15 shows an example of a cross section of an evaporator, with the design configuration according to the third embodiment of the present invention, taken along lines 15-15 as indicated in FIG. 14. FIG. 16 shows a horizontal section of a part of an evaporator, with the design configuration according to the third embodiment of the present invention, taken along lines 16-16 as indicated in FIG. 15. A first partition wall 6a separates the pairs of flash stages 4, while a second partition wall 6b separates the first and second flash stages 5a and 5b within a pair of flash stages 4. The first tube bundle passes 17a and 17b are located side by side in the lower half of the first and second double pass tube bundles 16a and 16b, while the second tube bundle passes 18a and 18b are located side by side in the upper half of the double pass tube bundles 16a and 16b. The vapor 21 enters the second tube bundle passes 18a and 18b where it partially condenses, while the remaining vapor 21 condenses in the tube bundle passes 17a and 17b below. Common water boxes 14a are installed on the tube bundle passes 17a and 17b for the parallel feeding of the first coolant stream 22a. Also common water boxes 14b are installed on the tube bundle passes 18a and 18b for the parallel feeding of the second coolant stream 22b.

If the design configuration of the third embodiment of the present invention were applied to a plurality of pairs of flash stages 5, the first coolant stream 23a would flow in serial flow communication from the outlet of the first tube bundle passes 17a and 17b of one pair of flash stages 5 to the inlet of the first tube bundle passes 17a and 17b of the next pair of flash stages 5. Similarly the second coolant stream 23b would flow in serial flow communication from the outlet of the second tube bundle passes 18a and 18b of one pair of flash stages 5 to the inlet of the second tube bundle passes 18a and 18b of the next pair of flash stages 5.

FIGS. 17-22 show a simplified flow schematic and sectional views of an example of an evaporator with a design configuration according to a fourth embodiment of the present invention. Each pair of flash stages 4 comprises a first flash stage 5a to which the flashing brine 20 enters, flashes down to a lower temperature and releases vapor 21 before being passed to the second flash stage 5b where it flashes down again to yet a lower temperature while releasing more vapor 21. Consequently, the first flash stage 5a operates at a higher vapor temperature then the second flash stage 5b.

In this design configuration, a pair of flash stages 4 comprises one common double pass tube bundle 16 with a first tube bundle pass 17 and a second tube bundle pass 18. The coolant is split into a first coolant stream 23a and a second coolant stream 23b, where the first coolant stream 23a is fed to the first tube bundle pass 17 of the common double pass tube bundle 16, while the second coolant stream 23b is fed into the second tube bundle pass 18 of the same double pass tube bundle 16 such, that the first and second coolant streams 23a and 23b flow in counter-current directions through the tube bundle passes 17 and 18 of the common double pass tube bundle 16.

Figure 19:
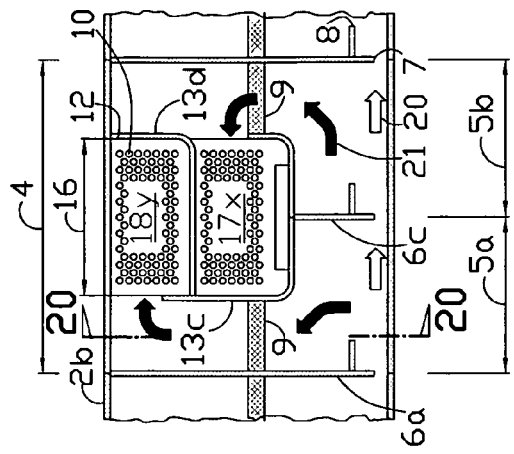
FIG. 19 shows a longitudinal section of a part of an evaporator with a design configuration according to the fourth embodiment of the present invention, taken along lines 19-19 as indicated in FIG. 20.
Figure 18:
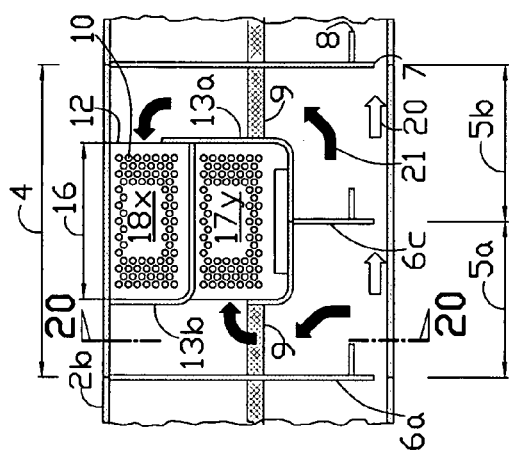
FIG. 18 shows a longitudinal section of a part of an evaporator with a design configuration according to the fourth embodiment of the present invention, taken along the lines 18-18 as indicated in FIG. 20.
Figure 17:
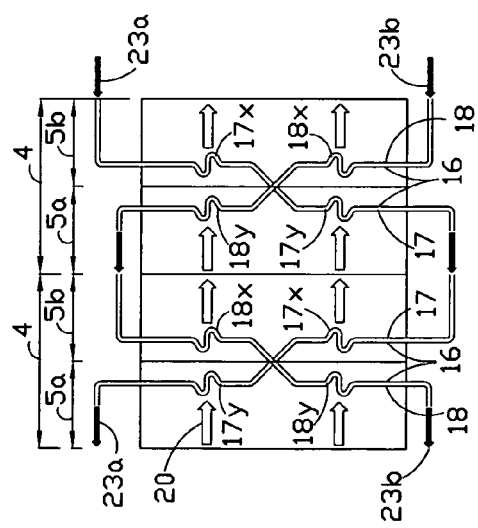
FIG. 17 shows a simplified flow schematic of a part of an evaporator with a design configuration according to the fourth embodiment of the present invention.
Figure 20:
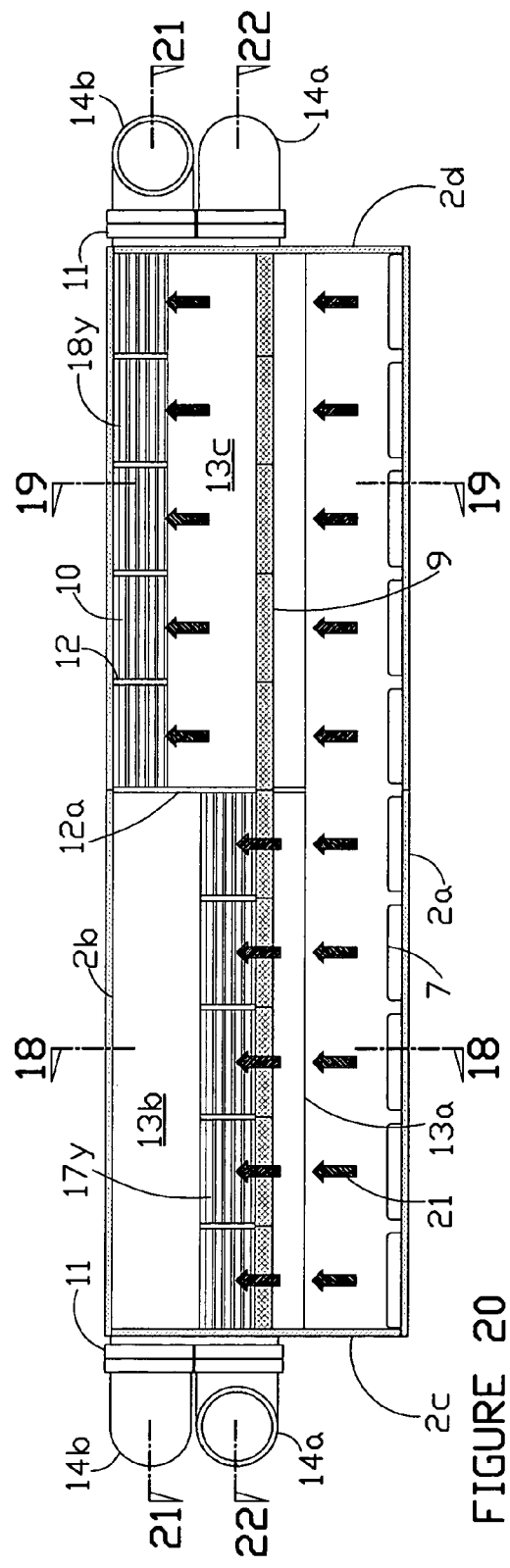
FIG. 20 shows a cross section of an evaporator with a design configuration according to the fourth embodiment of the present invention, taken along lines 20-20 as indicated in FIGS. 18 and 19.

FIGS. 18 and 19 show an example of longitudinal sections of a part of an evaporator with the design configuration according to the fourth embodiment of the present invention, taken along the lines 18-18 and 19-19 as indicated in FIG. 20. FIG. 20 shows a cross section of an evaporator, with the design configuration according to the fourth embodiment of the present invention, taken along lines 20-20 as indicated in FIGS. 18 and 19.

The first and second tube bundle passes 17 and 18 are divided on the vapor side by a tube support plate 12a into individual tube bundle pass sections. The first tube bundle pass 17 is divided into a first tube bundle pass section 17x, to which the first coolant stream 23a enters, and a second tube bundle pass section 17y from which the first coolant stream 23a discharges, while the second tube bundle pass 18 is divided into a first tube bundle pass section 18x to which the second coolant stream 23b enters and a second tube bundle pass section 18y from which the second coolant stream 23b discharges. Individual water boxes 14a are connected to the first tube bundle passes 17 for the first coolant stream 23a, while the water boxes 14b are connected to the second tube bundle passes 18 for the second coolant stream 23b.

The tube bundle shell parts 13a, 13b, 13c and 13d are arranged such that the vapor 21 of the second flash stage 5b, with the lower vapor temperature in the pair of flash stages 4, condenses on the first tube bundle pass sections 17x and 18x to which the first and second coolant streams 23a and 23b are entering, while the vapor 21 of the first flash stage 5a, with the higher vapor temperature, condenses on the second tube bundle pass sections 17y and 18y from which the first and second coolant streams 23a and 23b are discharging.

The first coolant streams 23a pass through the tube bundle pass sections 17x located in the second flash stage 5b and tube bundle pass section 17y located in the first flash stage 5a in series, while the second coolant streams 23b pass through the tube bundle pass sections 18x located in the second flash stage 5b and tube bundle pass section 18y located in the first flash stages 5a also in series, compared to the design configurations in the first and third embodiments of the present invention, where the coolant passes through the tube bundles or tube bundle passes of the first and second flash stages 5a and 5b in parallel. As a result, the design configuration in the fourth embodiment of the present invention leads to a more uniform temperature difference between vapor 21 of both the first and second flash stages 5a and 5b and the first and second coolant streams 23a and 23b in the same flash stages.

With this arrangement, the cold ends of both first tube bundle pass sections 17x and 18x are located on the outer tube bundle ends where the tube sheets 11 are located, while the warm ends of the same tube bundle pass sections are located in the center area of the evaporator cross section where the tube support plate 12a is located. Consequently, the cold ends of both second tube bundle pass sections 17y and 18y are located also in the center area of the evaporator cross section, while the warm ends of those tube bundle pass sections are located on the left and right side of the evaporator cross section where the tube sheets 11 are located. Since the distance between the cold ends and warm ends of the tube bundle pass sections in this configuration is only about half compared to the distance between cold end and warm end of single pass tube bundles 15a and 15b in the design configuration of the first embodiment of the present invention, the transverse vapor velocities toward the cold ends of the tube bundles are significantly reduced.

The stage dividers 6a between the pairs of flash stages 4 extend from the shell roof 2b down to the shell bottom 2a while the stage divider 6c between the first and second flash stages 5a and 5b in a pair of flash stages is located between the tube bundle shell parts 13a and 13c and the shell bottom 2a. The tube bundle shell parts 13a, 13b, 13c, 13d and the tube support plate 12a in this configuration are acting together with the stage divider 6c as partition wall between the flash stages 5a and 5b in a pair of flash stages 4.

Figure 21:
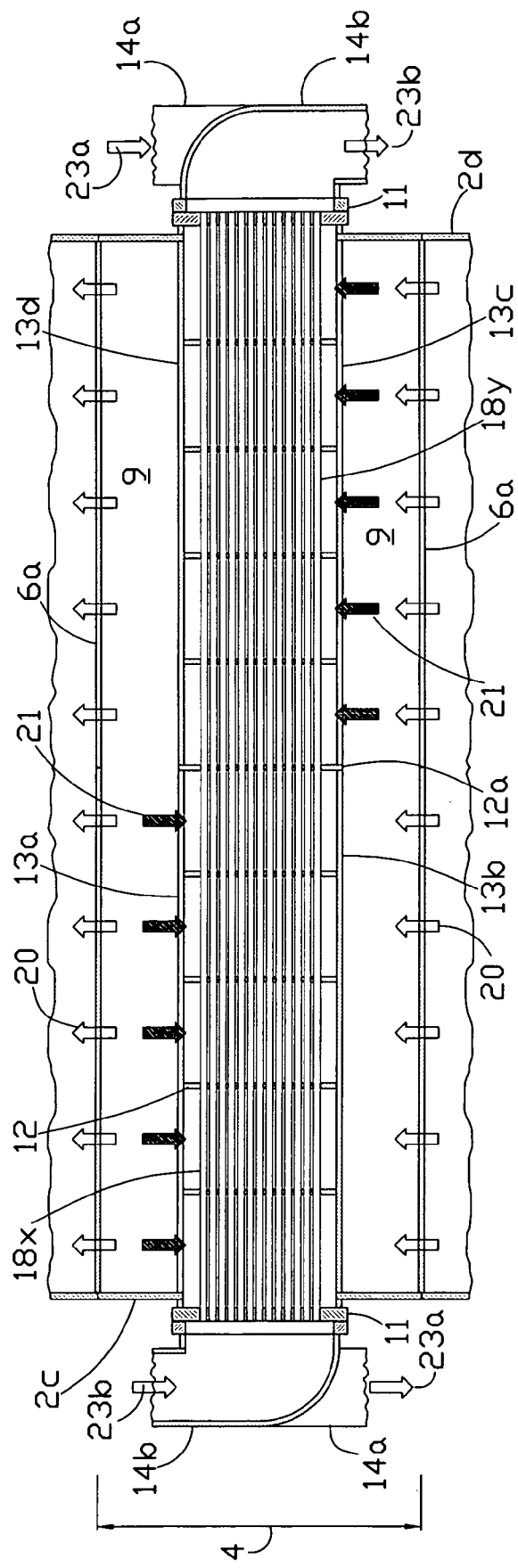
FIG. 21 shows a horizontal section of a part of an evaporator, with a design configuration according to the fourth embodiment of the present invention, taken along lines 21-21 as indicated in FIG. 20.
Figure 22:
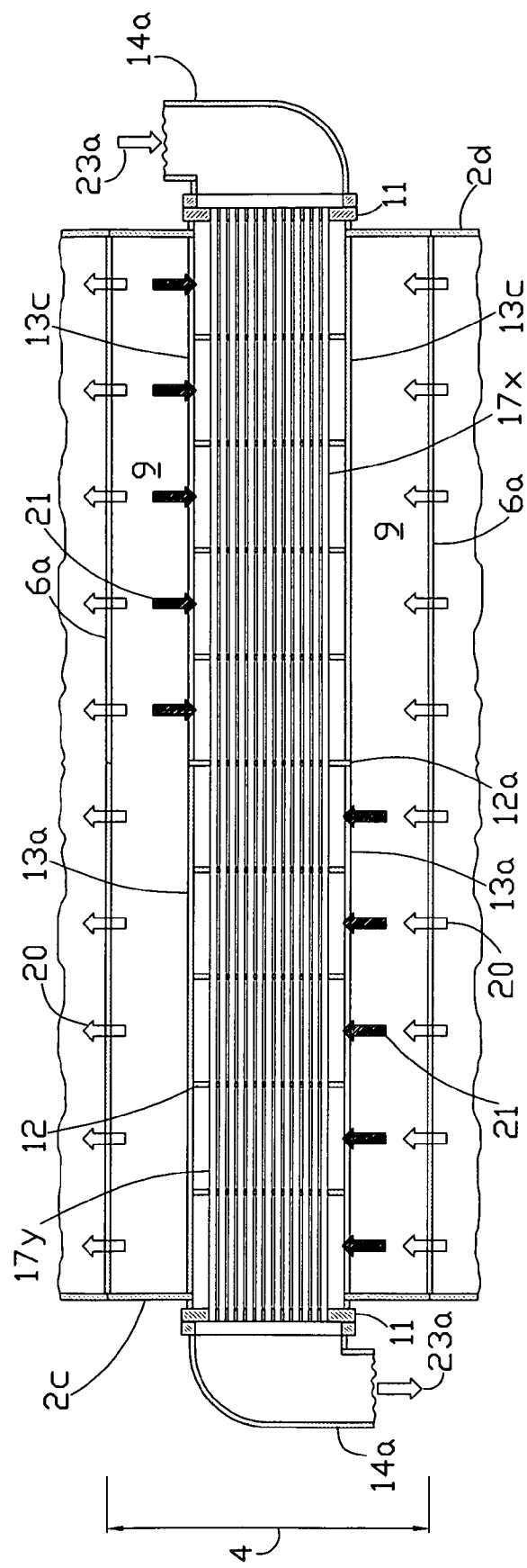
FIG. 22 shows a horizontal section of a part of an evaporator, with a design configuration according to the fourth embodiment of the present invention, taken along lines 22-22 as indicated in FIG. 20.

FIG. 21 shows a horizontal section of a part of an evaporator, with the design configuration according to the fourth embodiment of the present invention, taken along lines 21-21 as indicated in FIG. 20, showing the arrangement of the tube bundle shell parts 13b and 13d and the tube support plate 12a, separating the vapor space between the flash stages 5a and 5b on the tube bundle pass 18. FIG. 22 shows a horizontal section of a part of an evaporator, with a design configuration according to the fourth embodiment of the present invention, taken along lines 22-22 as indicated in FIG. 20, showing the arrangement of the tube bundle shell parts 13a and 13c and the tube support plate 12a, separating the vapor space between the flash stages 5a and 5b on the tube bundle pass 17.

In the design configuration of the fourth embodiment of the present invention, an arrangement of the tube support plate 12a which is acting as a part of the stage divider, in a position different from the half tube length may also be applied.

If the design configuration of the fourth embodiment of the present invention were applied to a plurality of pairs of flash stages 4, the first coolant stream 23a would flow in serial flow communication through the first tube bundle passes 17 of those pairs of flash stages 4, while the second coolant stream 23b would flow through the second tube bundle passes 18 of the same pairs of flash stages 4 also in serial flow communication.

For the purpose of simplifying the evaporator design and manufacturing, only one embodiment of the invention is preferably applied to all flash stages of an evaporator 1 or to all flash stages of the first and second evaporator sections 3a and 3b. All tube bundles may be preferably designed with the same tube surface area, same tube diameter, same number of tubes, same tube length etc. Nevertheless, it is also possible and due to process parameters eventually economical, to apply more than one of the design configurations of the four embodiments of the present invention to an evaporator 1 or to the first or second evaporator section 3a and 3b. Furthermore, one or more of the embodiments of the present invention may be applied to some of the plurality of flash stages of an evaporator 1 or first or second evaporator section 3a and 3b, while the remaining flash stages would be designed with single pass tube bundles in serial flow communication as in the prior art. Also, tube bundles and tube bundle passes of individual flash stages or of pairs of flash stages in an evaporator 1 or in evaporator sections 3a and 3b may be designed with different tube surface areas, different number of tubes, different tube diameters, different tube length, etc.

It is also possible to arrange the tube bundle passes of a double pass tube bundle side by side in comparison to the arrangement shown in FIGS. 10 and 14, where the first and second tube bundle passes are arranged on top of each other. The first and second single pass tube bundles 15a and 15b of a pair of flash stages 5, as shown in FIG. 4, or the double pass tube bundles 16a and 16b of a pair of flash stages 4, as shown in FIG. 14, do not have to sit side by side on a common stage divider wall 6b, but could be arranged, for example, in the middle of the flash stage, similar to the arrangement shown in FIG. 10.

The cross tube evaporators, shown in the examples with a rectangular shell, may be built as one single vessel, but other configurations may be possible as well. The shell or shell parts may have, for example, curved shapes; the evaporator may be built in several modules, which may be arranged side by side on the same level or in a stacked configuration. As described above, different types of coolant may be used in different sections of the evaporator, as it is practiced for brine re-circulation systems, where seawater may be used as coolant in the second evaporator section 3b (commonly described as heat rejection section) and re-circulating brine is used in the first evaporator section 3a (commonly described as heat recovery section). Other types of coolants may be used if practical for the desalination process.

Two parallel fed single pass tube bundles 15a and 15b in a pair of flash stages 4 based on the first embodiment of the present invention or two double pass tube bundles 16a and 16b in a pair of flash stages 4 based on the third embodiment of the present invention or a common double pass tube bundle 16 in a pair of flash stages 4 based on the fourth embodiment of the present invention, require only approximately the space of one double pass tube bundle 16 for a single flash stage 5 based on the second embodiment of the present invention or the space of one single pass tube bundle arranged in serial flow communication as in the prior art.

As a result of the design configurations in the first, third and fourth embodiments of the present invention, the cost for tube sheets 11, tube support plates 12, tube bundle shell parts 13a, 13b, 13c and 13d, water boxes 14, 14a, 14b can be significantly reduced. In addition, the evaporator bottom 2a, evaporator roof 2b and side walls 2c and 2d can be reduced in total size and cost.

One significant technical criteria of an evaporator is the performance ratio which is defined as the mass of distillate generated relative to the thermal energy consumed. The performance ratio is largely dependent on the difference between the top brine temperature and seawater temperature, the number of flash stages and the installed tube surface area.

Increasing the number of flash stages when utilizing the first, third and fourth embodiments of the present invention, provides the possibility of increasing the performance ratio of an evaporator by maintaining a certain total tube surface area and a certain electric power consumption for the coolant pumps, or could, alternatively allow a reduction of the tube surface area and electric power consumption for a given performance ratio when comparing to an evaporator designed with the configuration of the second embodiment of the present invention or with single pass tube bundles in serial flow communication as in the prior art.

Applying double pass tube bundles, in which the coolant is flowing in both passes in counter-current directions, provides the advantage of maximum uniformity of the vapor distribution over the cross section of a flash stage, resulting in more uniform loading of the mist eliminators 9, lower irreversible temperature losses and eventually slightly improved performance ratio of the evaporator. Possible problems in regard to mist eliminator fouling, reduced distillate quality, etc. can be largely eliminated. Those advantages can be realized with the design configurations in the second and third embodiments of the present invention to a maximum degree. In the design configuration of the fourth embodiment, this advantage is realized to a lesser degree, but still the transverse vapor movements are less than with single pass tube bundles used in the configuration of the first embodiment of the present invention or with single pass tube bundles in serial flow communication as in the prior art.

In any case, when applying individual tube bundle configurations of the present invention to the design of a multi-stage flash cross tube evaporator, either capital costs can be reduced, or electrical power consumption can be reduced, or the performance ratio can be increased, or a combination of those advantages can be achieved. This results in a reduction of the distilled water generation cost compared to an evaporator with flash stages using only single pass tube bundles in serial flow communication according to the prior art.

Although an exemplary embodiment of the invention has been described above by way of example only, it will be understood by those skilled in the field that modifications may be made to the disclosed embodiment without departing from the scope of the invention, which is defined by the appended claims.

What is claimed is:

1. A multi-stage-flash cross-tube evaporator comprising:
an evaporator shell of elongated shape, including an evaporator shell bottom and an end wall, the end wall extending substantially vertically and transversely to a longitudinal axis of the evaporator shell;
a plurality of first partition walls, each first partition wall being arranged substantially parallel to the end wall and dividing the evaporator shell internally into a plurality of flash stages, openings in the first partition walls allowing a solution flowing on the evaporator shell bottom to pass from each flash stage to the next and allowing the solution to flash down in each consecutive flash stage to a lower temperature compared to the temperature of the solution in the previous flash stage and to evaporate in each flash stage a portion of the solution, releasing a vapor;
wherein each of at least two of the flash stages comprises:
a double pass tube bundle extending across the evaporator shell substantially transversely to the longitudinal axis of the evaporator shell, the double pass tube bundle including a first tube bundle pass having a first plurality of tubes and a second tube bundle pass having a second plurality of tubes;
means for the first tube bundle pass to receive a first coolant stream and convey the first coolant stream within the first plurality of tubes;
means for the second tube bundle pass to receive a second coolant stream and convey the second coolant stream within the second plurality of tubes such that the first and the second coolant streams flow in counter-current directions through the first and second tube bundle passes; and
means for fluidly isolating the first coolant stream from the second coolant stream.

2. The multi-stage-flash cross-tube evaporator of claim 1, further comprising in at least one of the at least two flash stages:
a second partition wall, a tube support plate, a first tube bundle shell part, a second tube bundle shell part, a third tube bundle shell part and a fourth tube bundle shell part, wherein the aforesaid parts are configured to divide the at least one flash stage into a pair of flash stages, including a first flash stage and a second flash stage;
wherein the second partition wall is located below the double pass tube bundle and arranged substantially vertically and in parallel to the first partition walls, openings in the second partition wall allowing the solution to flow on the evaporator bottom from the first flash stage to the second flash stage and allowing the solution to flash down in the second flash stage to a lower temperature compared to the temperature of the solution in the first flash stage;
wherein the tube support plate is arranged substantially vertically and parallel to the longitudinal axis of the evaporator shell such that the first tube bundle pass is divided into a first tube bundle pass section to which the first coolant stream enters into the first tube bundle pass and a second tube bundle pass section from which the first coolant stream is discharged from the first tube bundle pass;
wherein the tube support plate is further arranged such that the second tube bundle pass is divided into a first tube bundle pass section to which the second coolant stream enters into the second tube bundle pass and a second tube bundle pass section from which the second coolant stream is discharged from the second tube bundle pass;
wherein the first tube bundle shell part partly encloses the second tube bundle pass section of the first tube bundle pass, the second tube bundle shell part partly encloses the first tube bundle pass section of the second tube bundle pass, the third tube bundle shell part partly encloses the first tube bundle pass section of the first tube bundle pass, the fourth tube bundle shell part partly encloses the second tube bundle pass section of the second tube bundle pass and the first, second, third and fourth tube bundle shell parts together with the tube support plate are configured such that substantially only a vapor released from the solution in the first flash stage can enter the second tube bundle pass sections of the first and second tube bundle passes and further such that substantially only a vapor released from the solution in the second flash stage can enter the first tube bundle pass sections of the first and second tube bundle passes.

* * * * *